(12) United States Patent
Demia

(10) Patent No.: US 6,575,025 B1
(45) Date of Patent: Jun. 10, 2003

(54) METHOD AND APPARATUS FOR MEASURING FORCES IN THE PRESENCE OF EXTERNAL PRESSURE

(75) Inventor: Laurent Demia, Macon Cedex (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/070,234

(22) PCT Filed: Sep. 1, 2000

(86) PCT No.: PCT/EP00/08608
§ 371 (c)(1),
(2), (4) Date: Feb. 28, 2002

(87) PCT Pub. No.: WO01/23853
PCT Pub. Date: Apr. 5, 2001

(30) Foreign Application Priority Data

Sep. 24, 1999 (FR) .............................................. 99 11948

(51) Int. Cl.$^7$ ............................................... E21B 47/00
(52) U.S. Cl. .................................................... 73/152.52
(58) Field of Search .................... 73/796, 794, 152.01, 73/152.46, 152.49, 152.52, 152.59

(56) References Cited

U.S. PATENT DOCUMENTS

| | | | | |
|---|---|---|---|---|
| 4,359,898 A | * | 11/1982 | Tanguy et al. | 73/152.48 |
| 4,608,861 A | * | 9/1986 | Wachtler et al. | 73/152.48 |
| 4,805,449 A | * | 2/1989 | Das | 73/152.48 |
| 4,811,597 A | * | 3/1989 | Hebel | 73/152.48 |

* cited by examiner

Primary Examiner—Max Noori
(74) Attorney, Agent, or Firm—Brigitte L. Jeffery

(57) ABSTRACT

In order to measure forces F exerted on a part in a given direction and in the presence of an external pressure p, the part has integrated therein a sensor (10) which delivers an output signal of the form $S=\alpha.F+\beta.p+\gamma$, and said sensor is dimensioned in such a manner as to cause the coefficient $\beta$ to be zero. To this end, a sensor (10) is used that includes a tube (12) formed by a thinner walled portion (12a) and a thicker walled portion (12b), together with strain gauges (16a, 16b, 18a, 20) mounted in the tube (12) and interconnected to form a Wheatstone bridge.

14 Claims, 1 Drawing Sheet

METHOD AND APPARATUS FOR MEASURING FORCES IN THE PRESENCE OF EXTERNAL PRESSURE

TECHNICAL FIELD

The invention relates to a method for measuring forces exerted on a part in a given direction and in the presence of external pressure applying a force on said part that is large compared with the forces to be measured.

The invention also relates to apparatus for measuring forces by implementing the method.

A privileged application of the invention lies in measuring the compression or traction forces exerted on a member such as a downhole tool or a drill string, e.g. when said member is being put into place in an oil well or when it is being extracted from such a well. The very high pressures that exist at the bottom of an oil well then apply a force on the member in question that is significantly greater than the force which it is desired to measure.

PRIOR ART

As shown in particular in document U.S. Pat. No. 4,926,396, it is known to measure pressure by using a transducer of tubular shape, made of piezoelectric ceramic. That document also shows that such a transducer, which is normally closed by plates at both ends, responds in different manners to stresses exerted along its axis and to stresses exerted radially, because of external pressure.

In addition, document U.S. Pat. No. 5,107,710 shows that it is known to measure a pressure by means of strain gauges interconnected to form a Wheatstone bridge, and to implant the bridge on a diaphragm, on the side opposite from the pressure that is to be measured.

However, no sensor is known that makes it possible to measure forces exerted in a given direction, independently of an external pressure that is also acting on the sensor and that is capable of giving rise to forces that are significantly higher than the forces to be measured.

SUMMARY OF THE INVENTION

Specifically, the invention provides a method of measuring forces F in the presence of an external pressure p, which method is designed to be substantially insensitive to the forces generated by said pressure, including when said forces are much greater than the forces to be measured.

According to the invention, this result is obtained by means of a method of measuring forces F exerted on a part in a first given direction in the presence of external pressure P, the method being characterized in that the deformation of a wall is measured in an axial direction parallel to the first direction and in at least two points of differing wall thicknesses in a second direction forming a non-zero angle with the first direction so as to compensate for the effect of the pressure p.

The invention also provides a method of measuring forces exerted on a part in a given direction and in the presence of an external pressure, the method being characterized in that it consists in integrating a sensor in the part, the sensor being sensitive to the forces F and to the pressure p and delivering an output signal S of the type $S=\alpha.F+\beta.p+\gamma$, where $\alpha$ if a force coefficient, $\beta$ is a pressure coefficient, and $\gamma$ is an offset value, and in dimensioning said sensor in such a manner as to cause the pressure coefficient $\beta$ to be zero.

In a preferred embodiment of the invention, a sensor is used comprising a tube including a portion of thinner wall thickness and a portion of thicker wall thickness, having an axis extending along the first direction, and in which deformations along said axis and in a direction orthogonal thereto are measured.

Other embodiments are also possible using sensors including a thinner portion and a thicker portion, e.g. of elliptical shapes or having bulges.

In which case, each wall deformation measurement is performed by two diametrically opposite strain gauges so as to compensate for deformation in bending.

Preferably, under such circumstances, use is made of one pair of strain gauges parallel to the first direction, two pairs of strain gauges orthogonal to the first direction, respectively placed in the thinner portion and in the thicker portion, and one pair of strain gauges that are inactive, the eight strain gauges being interconnected in a Wheatstone bridge, the output signal S from the sensor corresponding to the ratio between an output voltage $V_s$ and an input voltage $V_e$ of said bridge.

Advantageously, when the sensor is fitted with its strain gauges, the pressure coefficient $\beta$ can be decreased or even made zero by reducing the outside diameter of one of said tube portions.

In the preferred embodiment of the invention, a tube is used whose thinner portion initially has an inside diameter $b_0$ and an outside diameter $a_0$ defining a first ratio $d_0=b_0/a_0$ and whose thicker portion initially has an inside diameter $B_0$ and an outside diameter $A_0$ defining a second ratio $D_0=B_0/A_0$, the first and second ratios being such that:

$$\frac{2-v_0}{1-D_0^2} = \frac{1+v_0}{1-d_0^2}$$

where $v_0$ represents the Poisson coefficient as estimated for the tube; variations in the output signal from the sensor as a function of pressure are measured at zero force; the initial pressure coefficient $\beta_0$ of the sensor is deduced therefrom; an optimized value v of the Poisson coefficient of the tube is calculated from the relationship:

$$v = \frac{2(1-d_0^2)-(1-D_0^2)+\frac{4\cdot E}{K}\cdot\beta_0\cdot(1-d_0^2)\cdot(1-D_0^2)}{(1-d_0^2)+(1-D_0^2)}$$

where E represents Young's modulus for the tube, and K represents the gauge coefficient; and the pressure coefficient $\beta$ is made to be equal to zero:

when $\beta_0$ is negative, by decreasing the outside diameter $a_0$ of the thinner portion to give it a value a such that:

$$a = b_0 \cdot \sqrt{1 - \frac{1+v}{2-v}\cdot\left(1-\left(\frac{B_0}{A_0}\right)^2\right)}$$

and when $\beta_0$ is positive, by decreasing the initial outside diameter $A_0$ of the thicker portion to give it a value A such that:

$$A = \frac{B_0}{\sqrt{1-\frac{2-v}{1+v}\cdot\left(1-\left(\frac{b_0}{a_0}\right)^2\right)}}$$

The invention also provides apparatus for measuring forces F exerted on a part in a given direction in the presence of an external pressure p, the apparatus being characterized in that it comprises a sensor integrated in said part, said sensor being sensitive to the forces F and to the pressure p, and delivering an output signal S of the type S=α.F+β.p+γ where α represents a force coefficient, β represents a pressure coefficient, and γ represents an offset value, the sensor being dimensioned in such a manner that the pressure coefficient β is zero.

BRIEF DESCRIPTION OF THE DRAWING

A preferred embodiment of the invention is described below by way of non-limiting example and with reference to the accompanying drawing, in which.

DETAILED DESCRIPTION OF A PREFERRED EMBODIMENT OF THE INVENTION

When an arbitrary part or member is placed in air, it is easy to detect a limited force applied to said part in some given direction, e.g. the vertical direction. When the same source is applied to an arbitrary part or member in the presence of some external pressure, the force normally detected in said direction corresponds to the force actually applied to the part plus the product of the external pressure multiplied by the effective surface area of the part on which the pressure acts in the direction under consideration.

When the pressure becomes very high, as is the case specifically down an oil well, the force applied to the part becomes negligible relative to the force applied specifically in the same direction because of the surrounding external pressure.

Figure 1:
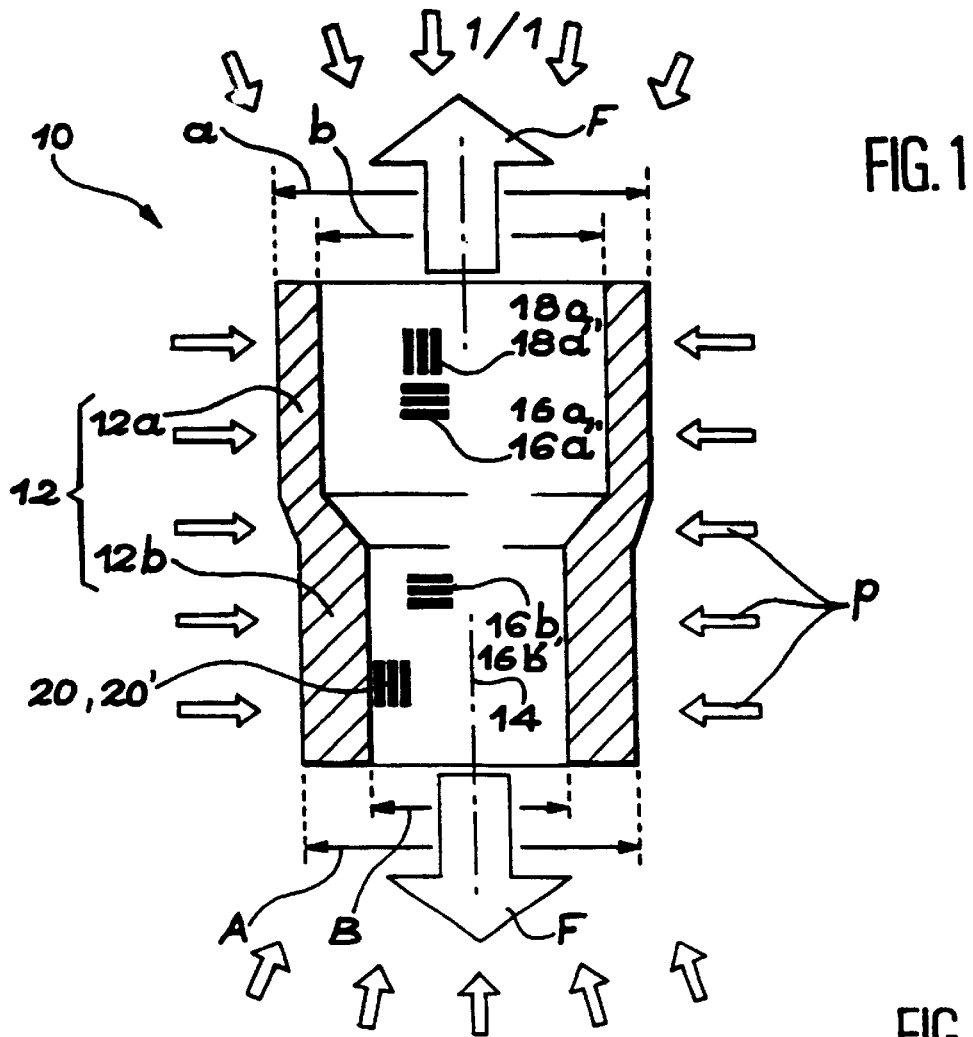
FIG. 1 is a diagrammatic section view of force-measuring apparatus of the invention.

The method of the invention consists in integrating a sensor within the part, where the sensor is of a special type that is dimensioned and instrumented in such a manner as to deliver an output signal that is substantially independent of the external pressure. In the preferred embodiment shown in FIGS. 1 and 2, the part (not shown) has integrated therein a sensor comprising a tube 12 made up of two portions 12a and 12b, together with strain gauges placed on the inside of the tube.

The tube 12 is a metal tube whose axis 14 is designed to be placed in the direction of application of the forces to be measured.

The first portion 12a of the tube 12 is a portion of relatively thin wall thickness having an outside diameter a and an inside diameter b. This thinner portion 12a is characterized by a first ratio d=b/a.

The second portion 12b of the tube 12 is a portion of relatively thick wall thickness having an outside diameter A and an inside diameter B. This thicker portion 12b is characterized by a second ratio D=B/A.

The inside diameter b of the thinner portion 12a is always greater than the inside diameter B of the thicker portion 12b. However, the relative dimensions of the outside diameters a and A of the portions 12a and 12b of the tube 12 can be arbitrary, i.e. the outside diameter a of the thinner portion 12a can be greater than, equal to, or less than the outside diameter A of the thicker portion 12b.

A first pair of strain gauges 16a & 16a' is stuck to the inside of the thinner portion 12a so as to measure deformations of this tube portion in a direction that is circumferential, i.e. orthogonal to the axis 14.

A second pair of strain gauges 16b & 16b' is stuck to the inside of the thicker portion 12b so as to measure deformations thereof in a direction that is circumferential, i.e. orthogonal to the axis 14.

A third pair of strain gauges 18a & 18a' is stuck to the inside of the thinner portion 12a so as to measure deformations of the tube along the axis 14.

Finally, a fourth pair of strain gauges 20 & 20' is mounted inside the tube 12 on a small part (not shown) made of the same metal as the tube and organized so as to be insensitive to forces applied to the tube. For this reason, this fourth pair of strain gauges is referred to as the "undeformable gauge" or the "inactive gauge". It is used for balancing the bridge. Nevertheless, it is subjected to the effects of temperature (expansion, . . . ).

The two strain gauges forming each of the pairs of strain gauges 16a & 16a', 16b & 16b', 18a & 18a', and 20 & 20' are mounted inside the tube 12 at locations that are diametrically opposite about the axis 14 of the tube so as to eliminate or compensate for deformation of the tube in bending.

Figure 2:
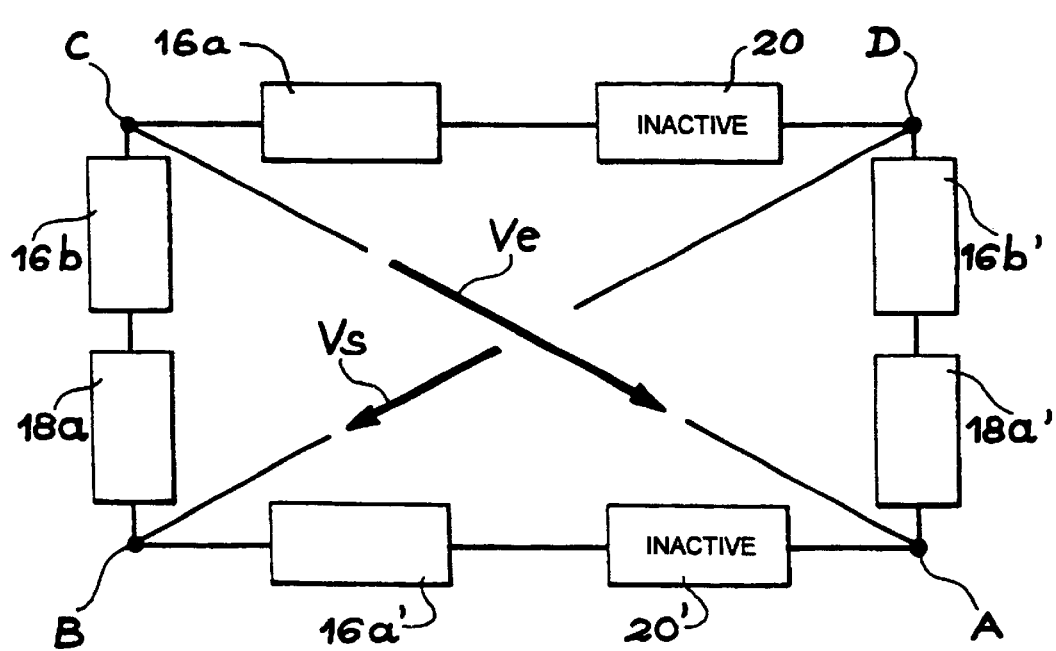
FIG. 2 shows the electrical connections of the strain gauges of the FIG. 1 apparatus so as to form a Wheatstone bridge.

As shown in FIG. 2, the eight strain gauges 16a & 16a', 16b & 16b', 18a & 18a', and 20 & 20' are interconnected so as to form a Wheatstone bridge whose four nodes are referenced by the letters A, B, C, and D.

Between the nodes B and C, the third strain gauge 18a and the second strain gauge 16b are connected in series so as to deliver positive voltages when they deform. The same is true for the strain gauges 18a' and 16b' which are connected in series between the nodes A and D. Conversely, the undeformable strain gauge 20 and the first strain gauge 16a are connected in series between the nodes D and C so as to deliver negative voltages. The same applies to the strain gauges 20' and 16a' which are connected in series between the nodes A and B.

In the Wheatstone bridge constituted in this way, an input voltage $V_e$ is applied between the nodes C and A while an output voltage $V_s$ is measured is measured between the nodes D and B.

If it is assumed that the resistance of the undeformable strain gauges 20 & 20' does not vary when the applied forces and pressure vary, and that the resistances of all eight strain gauges are substantially equal in absolute terms, it is easily shown that when a sensor implemented in this way is subjected to external pressure p in the absence of any force along its axis 14, the output signal S from the sensor corresponding to the ratio of the output voltage $V_s$ over the input voltage $V_e$ is given by the following relationship:

$$S = \frac{V_s}{V_e} \cong \frac{-K}{4 \cdot E}\left(\frac{2-\nu}{1-D^2} - \frac{1+\nu}{1-d^2}\right) \cdot p \tag{1}$$

where K represents the coefficient of the strain gauge, E represents Young's modulus for the tube; and ν represents the real or optimized Poisson coefficient of the tube.

Similarly, it is easily shown that when the same sensor is subjected to a force F along its axis 14 and in the absence of external pressure p, its output signal is given by the relationship:

$$S = \frac{V_s}{V_e} \cong \frac{K}{\pi \cdot E}\left(\frac{1+\nu}{a^2-b^2} - \frac{\nu}{A^2-B^2}\right) \cdot F \tag{2}$$

Consequently, in general, the output signal S from the sensor is of the type:

$$S = \alpha \cdot F = \beta \cdot p + \gamma \quad (3)$$

where $\alpha$, referred to as the "force coefficient" is given by the following relationship:

$$\alpha = \frac{1+v}{a^2 - b^2} - \frac{v}{A^2 - B^2} \quad (4)$$

$\beta$, referred to as the "pressure coefficient" is given by the following relationship:

$$\beta = \frac{2-v}{1-D^2} - \frac{1+v}{1-d^2} \quad (5)$$

and $\gamma$ corresponds to an offset value.

In accordance with the invention, the sensor is dimensioned so as to cause the pressure coefficient $\beta$ to become zero, thereby making the output signal S from the sensor insensitive to pressure p.

Given relationship (5), specifying the value of the pressure coefficient $\beta$ so as to cause said coefficient to have the value zero amounts to giving the first ratio d and the second ratio D as defined above values such that:

$$\frac{2-v}{1-D^2} = \frac{1+v}{1-d^2}$$

More precisely, the Poisson coefficient of the tube is given an initial estimated value $v_0$ (corresponding to the value obtained from materials tables), on the basis of which initial values $d_0$ and $D_0$ are calculated for the ratios d and D, using the relationship:

$$\frac{2-v_0}{1-D_0^2} = \frac{1+v_0}{1-d_0^2} \quad (6)$$

By way of example, $v_0$ can be given a value equal to 0.3 when the metal used for making the tube 12 is Inconel 718.

When performing tests by means of a sensor dimensioned to satisfy this relationship, it can happen that it is observed that the sensor is still sensitive to pressure, which means that the pressure coefficient $\beta$ has not really been reduced to zero. Consequently, the real or optimized value v for the Poisson coefficient is different from the estimated value $v_0$. Under such conditions, the pressure coefficient $\beta$ can be expressed by the following relationship:

$$\beta = \frac{-K}{4 \cdot E} \left( \frac{2-v}{1-D_0^2} - \frac{1+v}{1-d_0^2} \right) \quad (7)$$

In order to determine the real or optimized value v of the Poisson coefficient, various measurements or tests are then performed at zero force using the sensor 10 dimensioned in this way. More precisely, over all of the pressure and temperature ranges that are likely to be encountered by the sensor, variations in its output signal S are measured. The initial pressure coefficient $\beta$ of the sensor is deduced from these tests, and then the optimized or real value v of the Poisson coefficient is calculated using the relationship:

$$v = \frac{2(1-d_0^2) - (1-D_0^2) + \frac{4 \cdot E}{K} \cdot \beta_0 \cdot (1-d_0^2) \cdot (1-D_0^2)}{(1-d_0^2) + (1-D_0^2)} \quad (8)$$

When the optimized or real value v of the Poisson coefficient of the tube is known, the pressure coefficient $\beta$ is made equal to zero either by reducing the outside diameter $a_0$ of the thinner portion of the tube when $\beta_0$ is negative, or else by reducing the outside diameter $A_0$ of the thicker portion of the sensor when $\beta_0$ is positive.

More precisely, in the first case ($\beta_0 < 0$), the outside diameter $a_0$ of the thinner portion of the tube is given a value a such that:

$$a = b_0 \cdot \sqrt{1 - \frac{1+v}{2-v} \cdot \left(1 - \left(\frac{B_0}{A_0}\right)^2\right)} \quad (9)$$

and in the second case ($\beta_0 > 0$), the outside diameter $A_0$ of the thicker portion of the tube is given the value A such that:

$$A = \frac{B_0}{\sqrt{1 - \frac{2-v}{1+v} \cdot \left(1 - \left(\frac{b_0}{a_0}\right)^2\right)}} \quad (10)$$

It should be observed that these are the only dimensional modifications that can be made to the tube. Because of the presence of the strain gauges stuck to the inside of the tube, it is not possible to modify the inside diameters $b_0$ and $B_0$. In practice, it is also not possible to increase the outside diameters $a_0$ and $A_0$.

The above description shows that the apparatus for measuring forces of the invention enables the forces exerted on a part in a given direction to be measured independently of any large external pressure that might be applied to said part.

Naturally, the invention is not limited to the embodiment described above by way of example. Thus, any other force sensor delivering an output signal S in compliance with equation (3) and in which the pressure coefficient $\beta$ is made equal to zero by specific dimensioning and/or instrumentation comes within the ambit of the invention.

What is claimed is:

1. A method of measuring forces F exerted in a first given direction on a part in the presence of an external pressure p, the part including a sensor comprising a tube, the method comprising measuring deformation of the wall of the sensor; wherein:

the part comprises a downhole tool or drill string;

the sensor includes a portion of thinner wall thickness and a portion of thicker wall thickness; and the step of measuring deformation of the wall of the sensor comprises measuring deformation in an axial direction that is parallel to the first given direction; and measuring deformation of the wall of the sensor in a second direction that forms a non-zero angle with the first given direction, characterized in that said step of measuring deformation of the wall of the sensor in a second direction that forms a non-zero angle with the first given direction is made in at least two points of different wall thickness so as to compensate for the effect of the external pressure p.

2. A method as claimed in claim 1, wherein the sensor has an axis extending along the first given direction, the method comprising measuring deformation along the axis and in a direction orthogonal thereto.

3. A method as claimed in claim 1, comprising measuring wall deformation using two diametrically opposite strain gauges so as to compensate for deformation in bending.

4. A method as claimed in claim 3, comprising:

using one pair of strain gauges parallel to the first direction;

using two pairs of strain gauges orthogonal to the first direction, respectively placed in the thinner portion and in the thicker portion of the sensor wall;

using one pair of strain gauges that are inactive; and interconnecting the eight strain gauges in a Wheatstone bridge such that the output signal S from the sensor corresponds to the ratio between an output voltage $V_s$ and an input voltage $V_e$ of the Wheatstone bridge.

5. A method as claimed in claim 1, wherein the sensor delivers an output signal S of the type S=α.F+β.p+γ, where α if a force coefficient, β is a pressure coefficient, and γ is an offset value, characterised in that the sensor is dimensioned in such a manner as to cause the pressure coefficient β to be zero.

6. A method as claimed in claim 5, wherein the outside diameter of one of the portions of the sensor is reduced so as to cause the pressure coefficient β to be equal to zero.

7. A method as claimed in claim 6, wherein the thickness of the thinner or thicker portions of the sensor are modified so as to decrease the pressure coefficient β.

8. A method as claimed in claim 6, wherein the outside diameter of one of the portions of the sensor is reduced so as to decrease the pressure coefficient β.

9. A method as claimed in claim 8, wherein tube is used whose thinner portion initially has an inside diameter $b_0$ and an outside diameter $a_0$ defining a first ratio $d_0=b_0/a_0$ and whose thicker portion initially has an inside diameter $B_0$ and an outside diameter $A_0$ defining a second ratio $D_0=B_0/A_0$, the first and second ratios being such that:

$$\frac{2-\nu_0}{1-D_0^2} = \frac{1+\nu_0}{1-d_0^2}$$

where $\nu_0$ represents the Poisson coefficient as estimated for the tube;

variations in the output signal from the sensor as a function of pressure are measured at zero force;

the initial pressure coefficient $\beta_0$ of the sensor is deduced therefrom;

an optimized value ν of the Poisson coefficient of the tube is calculated from the relationship:

$$\nu = \frac{2(1-d_0^2)-(1-D_0^2)+\frac{4\cdot E}{K}\cdot \beta_0 \cdot (1-d_0^2)\cdot (1-D_0^2)}{(1-d_0^2)+(1-D_0^2)}$$

where E represents Young's modulus for the tube, and K represents the gauge coefficient; and the pressure coefficient β is made to be equal to zero:

when $\beta_0$ is negative, by decreasing the outside diameter $a_0$ of the thinner portion to give it a value a such that:

$$a = b_0 \cdot \sqrt{1 - \frac{1+\nu}{2-\nu}\cdot \left(1-\left(\frac{B_0}{A_0}\right)^2\right)}$$

and when $\beta_0$ is positive, by decreasing the initial outside diameter $A_0$ of the thicker portion to give it a value A such that:

$$A = \frac{B_0}{\sqrt{1-\frac{2-\nu}{1+\nu}\cdot \left(1-\left(\frac{b_0}{a_0}\right)^2\right)}}.$$

10. Apparatus for measuring forces F exerted in a first given direction on a part in the presence of an external pressure p, the apparatus including a sensor comprising a tube integrated in the part in which the deformation of the wall of the sensor is measured; wherein:

the sensor is integrated into a downhole tool or drill string;

the sensor includes a portion of thinner wall thickness and a portion of thicker wall thickness; and comprises means for measuring deformation in an axial direction that is parallel to the first given direction, and means for measuring deformation of the wall of the sensor in a second direction that forms a non-zero angle with the first given direction, characterized in that said means for measuring deformation of the wall of the sensor in a second direction that forms a non-zero angle with the first given direction are arranged in at least two points of different wall thickness so as to compensate for the effect of the external pressure p.

11. Apparatus as claimed in claim 10, wherein the sensor delivers an output signal S of the type S=α.F+β.p+γ where α represents a force coefficient, β represents a pressure coefficient, and γ represents an offset value, the sensor being dimensioned in such a manner that the pressure coefficient β is zero.

12. Apparatus as claimed in claim 10, wherein the tube has a thinner portion (12*a*) with an inside diameter (b) and an outside diameter (a) defining a first ratio d=b/a, and a thicker portion of the tube having an inside diameter (B) and an outside diameter (A) defining a second ratio D=B/A, with said ratios being such that:

$$\frac{2-\nu_0}{1-D_0^2} = \frac{1+\nu_0}{1-d_0^2}$$

where ν represents the optimized Poisson coefficient of the tube.

13. Apparatus as claimed in claim 12, wherein the means for measuring deformations of the tube comprise strain gauges mounted inside the tube and electrically interconnected so as to form a Wheatstone bridge powered by an input voltage $V_e$ and delivering an output voltage $V_s$, the output signal S from the apparatus corresponding to the ratio between the output voltage $V_s$ and the input voltage $V_e$.

14. Apparatus as claimed in claim 13, wherein a first strain gauge and a second strain gauge are mounted respectively in the thinner portion and the thicker portion of the tube so as to measure deformations in directions orthogonal to the axis;

a third strain gauge is mounted in the thinner portion so as to measure deformations along the axis;

an undeformable strain gauge is mounted in the tube;

the first strain gauge and the undeformable strain gauge are connected in series; and the second strain gauge and the third strain gauge are connected in series to form the Wheatstone bridge.

* * * * *